Figures 1, 2, 7:
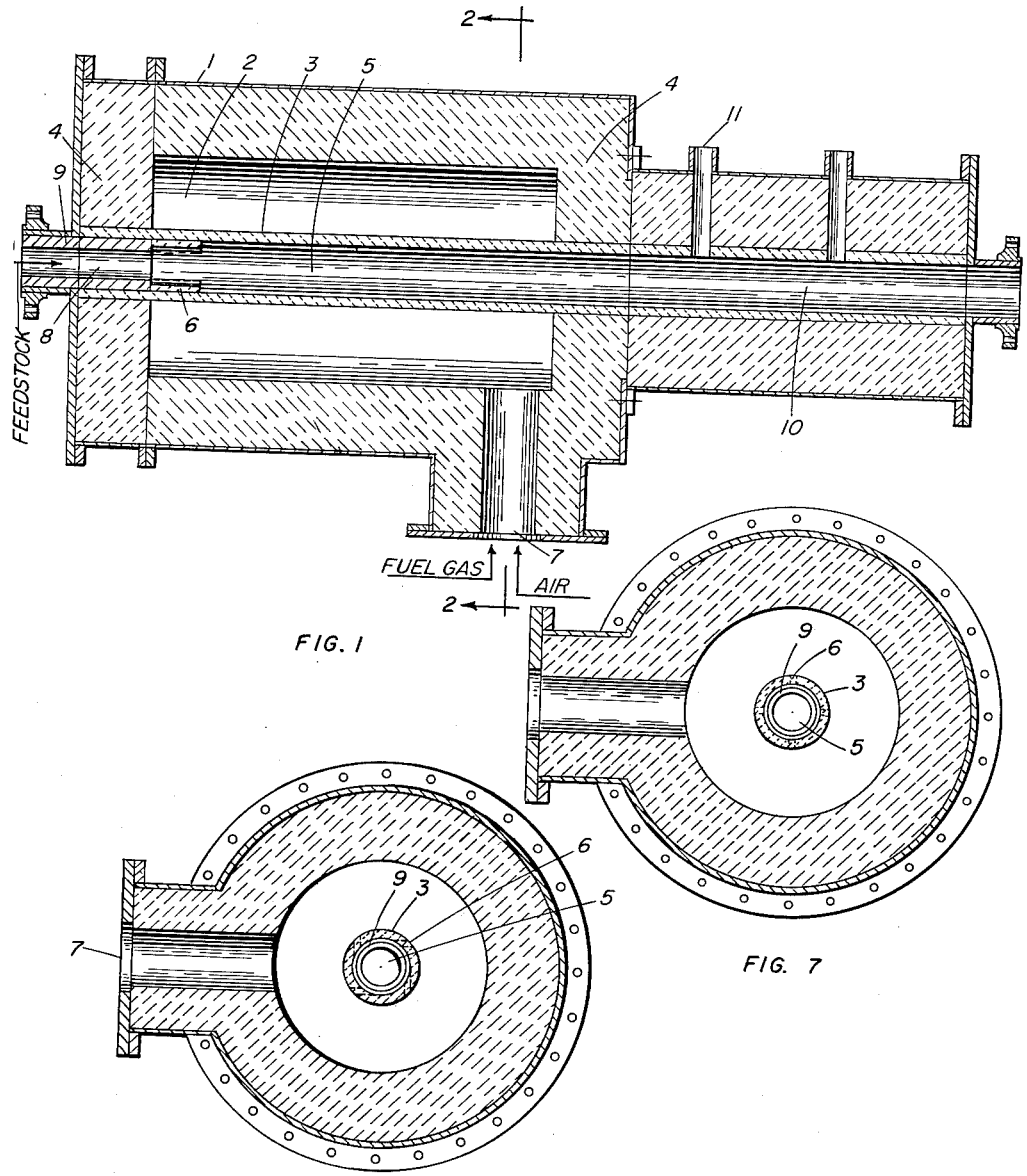

Oct. 23, 1962 — T. S. WHITSEL, JR — 3,060,004
CARBON BLACK APPARATUS
Filed March 30, 1960 — 3 Sheets-Sheet 1

INVENTOR.
TRAVIS S. WHITSEL JR.
BY
ATTORNEY

Oct. 23, 1962 T. S. WHITSEL, JR 3,060,004
CARBON BLACK APPARATUS
Filed March 30, 1960 3 Sheets-Sheet 3

INVENTOR.
TRAVIS S. WHITSEL JR.
BY

ATTORNEY

United States Patent Office 3,060,004
Patented Oct. 23, 1962

3,060,004
CARBON BLACK APPARATUS
Travis S. Whitsel, Jr., Borger, Tex., assignor to United Carbon Company, Inc. (Maryland), Houston, Tex., a corporation of Maryland
Filed Mar. 30, 1960, Ser. No. 18,599
13 Claims. (Cl. 23—259.5)

This invention relates to carbon black. More particularly, it relates to the preparation of carbon black. Still more particularly, it relates to a method and apparatus for producing carbon black by thermal decomposition of a hydrocarbon.

The preparation of furnace carbon black by thermal decomposition of a gaseous or liquid hydrocarbon is well known. In general, this method of preparation comprises decomposing a hydrocarbon by the heat generated from the burning of a portion of the hydrocarbon and/or by decomposing the hydrocarbon by subjecting it to heat generated by the substantially complete combustion of a second, and generally different, hydrocarbon. The hydrocarbon feedstock employed, the method of injecting the reactants into the reactor, reaction temperature, reaction time, space velocity, peripheral velocity and turbulence of the reaction mass in the reaction chamber, ratio of refractory surface to reaction chamber volume, among others, are all variables which determine the grade of carbon black as well as the quality of any particular grade. There has been and continues to be considerable study of these variables, with the result that over the years certain modifications or improvements of the basic furnace process for preapring carbon black have been proposed.

One such modification provides for the tangential injection of a combustible hydrocarbon mixture into a combustion chamber of a substantially tubular reactor having an elongated reaction chamber coaxial and in open end communication with but substantially smaller in diameter than the combustion chamber whereby a rotational motion is given to the mixture as it enters the reaction chamber. Another modification provides for the injection of the combustible hydrocarbon mixture into a combustion chamber of a similarly shaped reactor as a plurality of streams which impinge on the walls of the combustion chamber prior to entering the reaction chamber. In each modification, a violently turbulent mass is produced as the combustible mixture and its products of combustion are constricted on their entry into the reaction chamber. A hydrocarbon feedstock is then introduced into this turbulent mass, usually as an axial flow passing first through the combustion chamber, and is rapidly decomposed.

Although these modifications and others have proved successful in the preparation of furnace blacks, nevertheless, they are subject to various disadvantages. A principal disadvantage is the fact that the various apparatus relied on to produce the desired turbulent mixing are difficult and costly to fabricate and maintain. A further disadvantage is that the feedstock is usually projected as a spray across the combustion chamber prior to its entry into the reaction chamber, thus subjecting it to possible oxidation in the combustion chamber. This manner of injection, moreover, always presents the possibility of inaccurate direction of the feedstock spray with the result that the entrance surfaces of the reaction chamber may be subjected to coking. A still further disadvantage, especially of those modifications in which the combustible mixture is injected tangentially into a large combustion chamber, is the loss of peripheral velocity due to friction created by the large surface area. As a result, the highest peripheral velocity is apt to be attained in the combustion chamber rather than at the optimum point in the process, i.e., where the combustible mixture and hydrocarbon feedstock meet in the reaction chamber.

These modifications or improvements of the furnace process, therefore, are confronted with various disadvantages which affect their performances in various ways. Accordingly, in spite of the apparent commercial success of certain of these modifications, there has continued to remain a demand for a still further improved process of producing furnace black having the advantages of such modifications but which is not subject to the disadvantages thereof. It is a principal object of this invention, therefore, to provide such a process. It is particularly an object of this invention to provide such a process in which the flow of the combustible mixture and its products of combustion may be controlled so that an optimum rotational motion thereof is attained at the most profitable point in the process. A further object is to provide a process which may be conducted in a reactor of a design which is neither difficult nor costly to fabricate and/or maintain. A still further object is to provide a process applicable to the preparation of various grades of furnace black in high yield and of consistent quality in a reactor which itself may be readily and simply modified to accommodate such varied preparations. An addition object is to provide a process capable of being conducted in a reactor of a design permitting easy access to the interior thereof.

These objects have been met in a relatively simple yet surprisingly effective manner. In general, the process of this invention comprises introducing a hydrocarbon feedstock into one end of an elongated tubular reaction zone maintained at a carbon black forming temperature. Similar to the above described modifications, a material capable of creating and maintaining this temperature is also introduced into the reaction zone. According to this invention, however, this material is caused to enter the reaction zone near the same end thereof as the entry of the feedstock but as a plurality of separate streams, the initial axis of which are directed at substantially right angles to the flow of the feedstock. An intimate mixture of the material and the feedstock is thus obtained and the feedstock brought to its cracking temperature. The reaction is terminated at a predetermined time, and the resultant carbon black-bearing gases subjected to further treatment to separate and collect carbon black.

Figure 4:
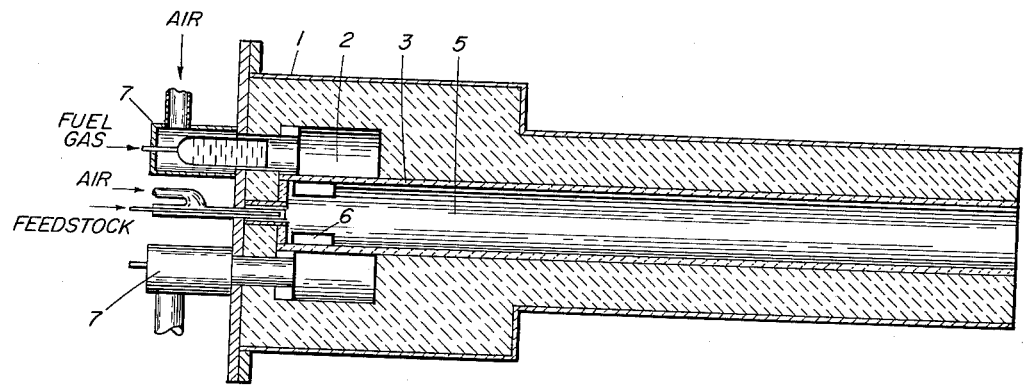
Figure 3:
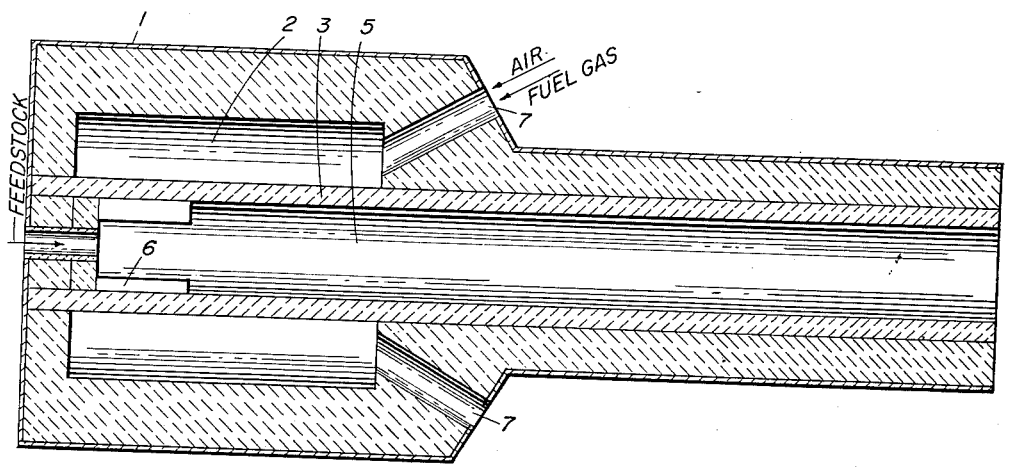
Figure 5:
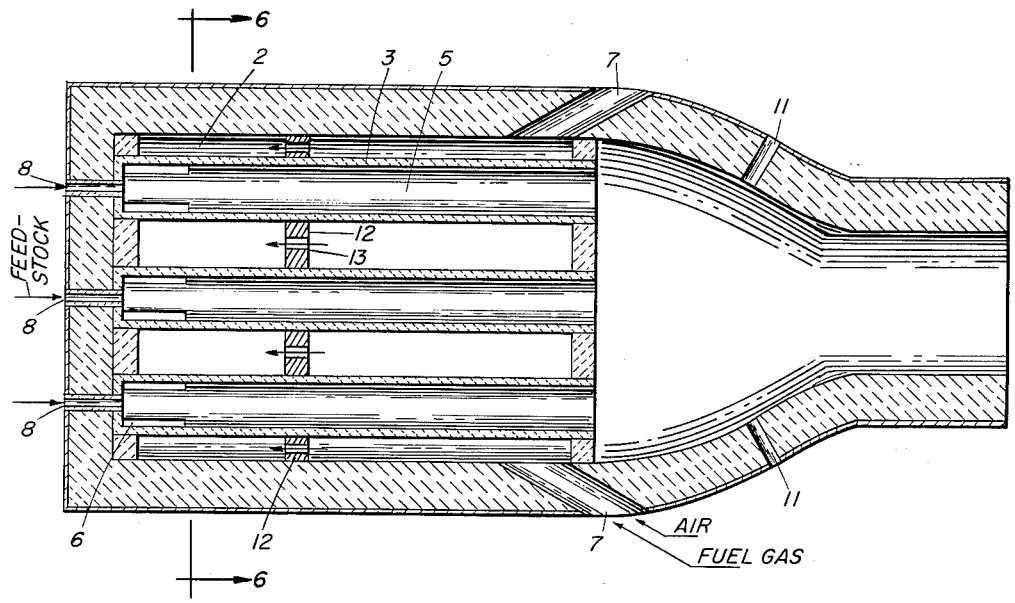
Figure 6:
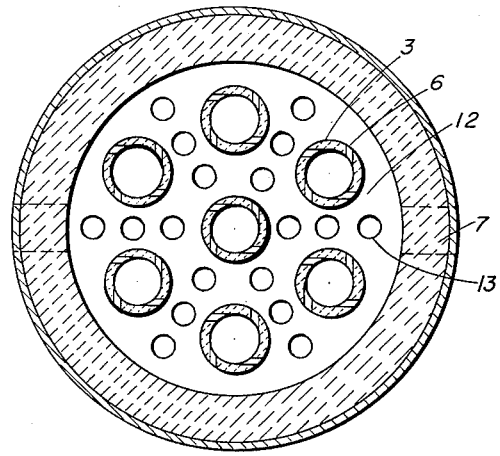

Although the process of this invention may be conducted in any reactor of a configuration suitable to carry out the steps thereof, nevertheless, it can be more easily described and its advantages best appreciated by reference to various specific reactors. For this purpose, therefore, the process of this invention will be further discussed in conjunction with the accompanying drawing in which:

FIGURE 1 is a sectional plan view of one embodiment;
FIGURE 2 is an end view taken along the line 2—2 in FIG. 1;
FIGURE 3 is sectional plan view of another embodiment;
FIGURE 4 is a sectional plan view of another embodiment;
FIGURE 5 is a sectional plan view of still another embodiment;
FIGURE 6 is an end view taken on the line 6—6 of FIG. 5;
FIGURE 7 is an end view similar to FIGURE 2 showing the alternative radial slots.

In describing the process and apparatus of this invention, the terms "combustible mixture" and "combustion mass" will be employed. By the former is meant a mixture of a hydrocarbon and a combustion supporting oxygen-bearing gas. By the latter is meant a mass comprising the products resulting from the combustion of the combustible mixture which mass may or may not include any unreacted combustible mixture or a combustion supporting oxygen-bearing gas substantially free of unreacted hydrocarbon.

Referring now to the sectional plan view shown in FIGURE 1 of the drawing, reference numeral 1 denotes a reactor having a generally tubular combustion zone 2 open at each of its ends. Surrounded by said combustion zone and extending into the open ends thereof is a hollow open end reaction tube 3, supported at its ends by refractory walls 4, providing a generally tubular reaction zone 5. Reaction zone 5 is in communication with combustion zone 2 through a plurality of inlet ports 6. The axes of these ports are at substantially right angles to the axis of reaction zone 5. Thus, the ports may be radially disposed as shown in FIGURE 7 but are preferably tangentially disposed to the inner surface of tube 3 as shown in FIGURE 2, the latter modification forming the basis for subsequent explanation of the invention. The ports may vary in number but four of such ports or slots, as shown, readily provide the desired turbulence and distribution of combustion mass. Near the opposite end of combustion zone 2 are inlets 7, preferably tangentially situated, for introducing into combustion zone 2 a combustible mixture comprising a hydrocarbon fuel and a combustion-supporting oxygen-bearing gas. This mixture may be introduced into combustion zone 2 either as such, or the components thereof may be introduced separately. Alternatively, these inlets may be used to introduce a combustion-supporting oxygen-bearing gas alone. While FIGURES 1 and 2 show only one such inlet 7, more than one may obviously be employed.

Extending through inlet end 8 of reaction zone 5 and adjacent the inner surface of reaction tube 3 is a hollow insert tube 9 longitudinally movable with respect to slots 6. By proper positioning of tube 9, therefore, the cross-sectional areas of slots 6 may be varied as desired as illustrated by the dotted representation in FIGURE 1 of tube 9 in its extended position. Also extending through inlet end 8, but not shown in FIGURE 1, is a hydrocarbon feedstock injection means comprising a feedstock spray nozzle of conventional design, said means also being adjustable with respect to slots 6. At its opposite end, reaction zone 5 communicates with quench zone 10 having quench ports 11. As illustrated, the quench zone merely constitutes an extension of the reaction zone and is of substantially similar configuration. The linings of combustion and quench zones 2 and 10 as well as reaction tube 3 itself are formed of a high temperature refractory material, the various commercially available types of which are well known by those skilled in the art. Backing up the linings is refractory insulation, the entire reactor in turn being enclosed in a steel shell or casing.

In conducting the process of this invention, a combustible mixture comprising process air and a hydrocarbon fuel is formed in combustion zone 2 by injecting it as such or as its component parts through inlets 7. This mixture is ignited and burned, and caused to flow in a longitudinal direction around the periphery of reaction tube 3 at a relatively slow velocity to permit substantially complete combustion of the hydrocarbon within the combustion zone prior to entry of any part thereof into the reaction zone. When combustion is substantially complete, the relatively slowly flowing resultant combustion mass is caused to enter reaction zone 5 by being accelerated through tangential ports or slots 6. The result is a spirally flowing mass having a high peripheral velocity and moving longitudinally within the reaction zone countercurrent to the flow in the combustion zone. Once a spiral or helical flow of the combustion mass has been established within the reaction zone, hydrocarbon feedstock is introduced thereinto by means of the feedback injector extending through inlet 8. The particular means for effecting this introduction may be varied, but in any case it should be capable of placing a vaporized or atomized spray of feedstock into the vortex formed by the high velocity spiralling mass near the point of formation thereof at slots 6. The initimate mixing of feedstock and combustion mass resulting as the feedstock is swept into the mass causes a substantially instantaneous temperature increase of the feedstock to its cracking temperature with resultant formation of carbon black and by-products. The entire mass continues to follow the spiralling path of the combustion mixture through the reaction zone and into the quench zone where the reaction is terminated by cooling with water or other suitable cooling medium introduced through quench ports 11. The cooled reaction mass with entrained carbon black then exits from the reactor for subsequent separation and collection of carbon black by means not illustrated and which form no part of this invention.

An advantage of the embodiment of FIG. 1 resides in the flow of combustible mixture nad combustion mass in combustion zone 2 around the periphery of reaction tube 3 and counter to the main reaction flow in reaction zone 5. The cracking of the feedstock being an endothermic reaction, an undesirable temperature decrease within the reaction zone is observed under normal circumstances as the quench zone is approached. In contrast, the burning of the hydrocarbon fuel is exothermic. Accordingly, the end of the reactor at which the reaction zone temperature decreases is the same end at which combustion is initiated in the combustion zone. As a result, temperature decrease in the reaction zone is minimized by indirect heat exchange between the two zones. Alternatively, when air alone is employed and is introduced into the reaction zone through what normally constitutes the combustion zone, the heat exchange is in the opposite direction so that the air becomes heated prior to entry through the tangential slots.

A particular feature of the present invention is the introduction of the combustion mass into the reaction zone through the circumferential wall of the reaction tube while feedstock is longitudinally introduced thereinto. Since bridging of the combustion zone by the feedstock as heretofore done is thus eliminated, possible oxidation of the hydrocarbon feedstock in the combustion zone is avoided. Similarly, the formation of coke on the mouth of the reaction tube caused by bridging of the combustion zone with feedstock as heretofore done is minimized. There is an additional advantage to the described circumferential introduction of combustion mass into the reaction zone, however, that is of equal if not greater significance. Heretofore, the desired rotational velocity has been imparted to the combustion mass by an initial tangential introduction of the combustible mixture or its components into a large combustion chamber. This rotational motion is then compressed into a smaller diameter reaction chamber concentric with and in axial communication with the combustion chamber. The result of this practice is a loss of rotational velocity because of friction on the greater surface area over which the mass passes in the combustion chamber and because of friction created on subsequent constriction of the high velocity flow into the reaction chamber. Accordingly, the maximum rotational velocity is obtained in the combustion chamber rather than at a point in the reaction chamber. In the present invention, however, rotational velocity is imparted to the combustion mass only as it enters the reaction zone so that the loss of momentum due to wall friction is considerably minimized. Thus, the greatest rotational velocity is imparted to the combustion mixture at the optimum point in the reactor, i.e., where hydrocarbon feedstock and combustion mass initially meet.

Since the rotational flow of combustion mass as it enters the reaction zone through the tangential slots as in the present process, is over a smaller area as compared to other processes in which it is first rotated in a large combustion chamber, the turbulence in the reaction zone of instant process tends to be greater. The degree of this turbulence, moreover, may be altered without changing the rates of fuel and process air merely by varying the cross sectional areas of slots 6. As the cross sectional areas of the slots are increased or decreased, the pitch of the resultant spiral flow, as well as the peripheral velocity thereof, is increased or decreased with resultant variations in turbulence. The particular means for varying the cross sectional areas of slots 6 may take any of various mechanical forms. Thus, in addition to the longitudinally movable tube previously described, the means may comprise an outer longitudinally movable sleeve or an outer rotating sleeve having matching slots. The same effect may be readily accomplished simply by packing the slots to the desired extent with refractory material. The shape of the slots 6 may take various forms, although a particularly satisfactory shape for the purposes of this invention has proved to be a generally rectangular one in which the larger dimension is substantially parallel to the longitudinal axis of the reaction zone.

In the description of the process to this point, the hydrocarbon feedstock has not been specified since the process is not restricted thereby nor is there any desire to so restrict it. Generally, any gaseous or liquid hydrocarbon may be employed in the process. As used throughout the specification and claims, therefore, the term hydrocarbon feedstock is intended to mean generally any hydrocarbon. Thus, natural gas as well as heavier hydrocarbon oils from both petroleum and non-petroleum sources may be employed in the process of this invention. Such oils may contain aliphatic hydrocarbon compounds whether acyclic or cyclic, saturated or unsaturated or any aromatic hydrocarbon. The hydrocarbon fuel likewise may be varied and may be the same as or different from the hydrocarbon feedstock. Generally, however, the hydrocarbon fuel will be natural gas. The combustion supporting oxygen-bearing gas employed may be air, oxygen-enriched air, oxygen or the like, but generally for practical reasons, will be air. The amount of combustion supporting oxygen-bearing gas employed will vary depending upon the hydrocarbon fuel as well as the grade of carbon black being produced. The amount of oxygen employed in any particular case may be readily determined by one skilled in the art. Usually, the amount of oxygen employed will range from about that stoichiometrically required to obtain substantially complete combustion of the hydrocarbon fuel to as much as 125–140% of the stoichiometric amount. The predetermined amount of oxygen-bearing gas to be employed will generally be introduced to the reactor along with the hydrocarbon fuel, although some may also be introduced axially with the feedstock. In the latter case, the axially introduced air will usually not exceed about 8% of the total requirement. Alternatively, when the feedstock itself is to be the sole source of heat, air will be introduced into the combustion zone in the absence of hydrocarbon fuel.

FIGURE 3 shows a modification of the reactor of FIGURE 1 in which the inlets 7 are situated so as to direct the combustible mixture subtantially longitudinal to the combustion zone. As in FIGURE 1, there may be one or more such inlets, a plurality usually being employed to provide a uniform distribution of combustible mixture throughout the cross sectional area of the combustion chamber. FIGURE 4 is another modification of the embodiment of FIGURE 1 in which the combustion zone 2 is abbreviated and the inlets 7 are situated at the inlet end of the reactor.

FIGURES 5 and 6 of the drawing illustrate a reactor having a plurality of reaction zones within a single combustion zone. Such a reactor is of particular advantage in the preparation of those types of carbon black in which it is difficult to maintain quality while increasing the volume of the reactor as, for instance, in the manufacture of SAF. This difficulty is probably due to the fact that any increase in the cross sectional area of a reaction zone is accompanied by a smaller increase in radiating surface area so that radiant heat transfer to and consequently the temperature increase in the reaction zone are at a rate too slow to produce the desired result. This has been compensated for in the past by using a plurality of separate reactors of proved operational size each provided with its own feedstock, fuel and air inlets. Not only is this uneconomical but there is no assurance that quality still may not vary from reactor to reactor.

In the reactor of FIGURES 5 and 6, combustion zone 2 is provided with a plurality of equidistantly spaced reaction tubes 3, the number dependent upon the size of the combustion zone, each of which is completely surrounded by and in surface contact with the combustion zone. Towards the exit end of the reactor are a plurality of spaced inlets 7 for introducing combustible mixture longitudinally into the combustion zone. Situated between the reaction tubes is one or more baffle members 12 provided with apertures 13 for equally distributing the combustible mixture around the tubes 3 prior to passage of the combustion products thereof through slots 6. When more than one baffle member 12 is employed, it may be advantageous to stagger the apertures in succeeding baffle members. While the baffle members or plates 12 illustrated in the drawing constitute a preferred embodiment of this invention, it is apparent that other forms of baffles may also be effectively employed. Each reaction tube is provided with a feedstock nozzle connected to a single feedstock header. As in the other embodiments, each of the tubes is provided with means for varying the cross sectional area of the slots 6 which may take any of various forms.

It is apparent from FIGURES 5 and 6 that the multitube reactor of this invention minimizes the economical disadvantages inherent in the use of a plurality of reactors. The reactor, moreover, is so designed as to permit a substantially equal transfer of heat through each tube and a substantially equal acceleration of combustion mass through each slot 6. In addition, criticality of quality control is not as exacting in the instant reactor as in the use of a plurality of separate reactors since a decrease of quality in one reaction zone is more nearly compensated for by a corresponding increase in quality in one or more of the other reaction zones. The reactor of FIGURES 5 and 6, of course, may take modifications similar to those discussed with respect to the embodiment of FIGURE 1 as more specifically considered in FIGURES 3 and 4.

A further advantage of the reactor of this invention, whether it comprises one or more reaction tubes, is that it can be employed to manufacture a plurality of grades of carbon black without altering the basic design. Thus, by proper adjustment of feedstock, fuel and air requirements taken together with modifications in feedstock injection, reaction time, and the like, varying grades of carbon black may be readily prepared. An additional advantage of this invention is the apparent simplicity of construction and maintenance of the reactor. The process of the present invention may be conducted in reactors other than those illustrated provided similar conditions are maintained. For instance, the means for introducing the combustible mixture may take other forms than shown as may the means for injecting hydrocarbon feedstock. It is apparent, therefore, that various mechanical modifications may be readily arrived at without altering the essence of the invention and such modifications, even though not specifically illustrated, are described or intended to be included herein.

The process of this invention is further described in the following examples which are by way of illustration only and not by way of limitation. Unless otherwise noted, all parts are by weight.

*Example 1*

This example employs a reactor similar to that illustrated in FIGURE 1. The hydrocarbon feedstock employed is an aromatic distillate having the following analysis:

| | |
|---|---|
| Gravity API | 18.0 |
| Viscosity SSU @ 100° F. | 35.9 |
| Ash | 0.0 |
| Carbon residue, Conradson, percent | 0.29 |
| Sulfur, percent | 0.59 |

Distillation, ° F.:

| | |
|---|---|
| IBP | 413 |
| 5 | 439 |
| 10 | 452 |
| 20 | 472 |
| 30 | 486 |
| 40 | 500 |
| 50 | 512 |
| 60 | 526 |
| 70 | 546 |
| 80 | 570 |
| 90 | 606 |
| 95 | 640 |
| EP | 670 |

The hydrocarbon fuel is natural gas with a heating value of 1050 B.t.u./cu.ft. The oxygen-bearing gas is air. The gas rate is 3650 cu. ft./hr.; air rate 55,000 cu. ft./hr. and feedstock rate 55 gal./hr. Yield of carbon black is 3.40 lbs./gal.

*Example 2*

The procedure of Example 1 is repeated on a similar reactor using a feedstock having the following analysis:

| | |
|---|---|
| Gravity API | 2.8 |
| Viscosity SSU @ 210° F. | 59.5 |
| Ash, percent | 0.007 |
| Carbon residue, Conradson, percent | 9.73 |
| Sulfur, percent | 0.25 |

Distillation, ° F.:

| | |
|---|---|
| IBP | 504 |
| 5 | 664 |
| 10 | 686 |
| 20 | 710 |
| 30 | 739 |
| 40 | 763 |
| 50 | 790 |
| 60 | 821 |
| 70 | 868 |
| 80 | 938 |

Gas rate is 4,000 cu. ft./hr., air rate 60,000 cu. ft./hr. and feedstock rate 70 gal./hr. Yield of carbon black is 4.12 lbs./gal.

I claim:

1. A reactor for producing carbon black which comprises: a first hollow member of a generally tubular configuration; a second hollow member also of a generally tubular configuration but of smaller diameter than said first member, at least a portion of said second member being circumferentially surrounded by said first member whereby a combustion zone is formed therebetween; means for introducing hydrocarbon fuel and a combustion supporting oxygen-bearing gas into said combustion zone; at least one circumferentially located slot in said second hollow member near one end thereof for introducing thereinto the combustion mass resulting from the combustion of said hydrocarbon fuel within said first hollow member, said second hollow member being provided with means for varying the cross-sectional area of said slot; and means for axially introducing hydrocarbon feedstock into said one end of said second hollow member.

2. A reactor according to claim 1 in which said slot is tangentially disposed.

3. A reactor according to claim 1 in which said slot is radially disposed.

4. A reactor according to claim 1 in which the cross sectional area of said slot is substantially rectangular.

5. A reactor for producing carbon black which comprises: an elongated tubular member; a plurality of reaction tubes equidistantly spaced within said member, said member surrounding at least a portion of the lengths of said tubes; means for introducing a hydrocarbon fuel and a combustion-supporting oxygen-bearing gas into said elongated tubular member; at least one circumferentially located slot in each of said reaction tubes near one end thereof for introducing thereinto the combustion mass resulting from the combustion of said hydrocarbon fuel within said tubular member, each of said reaction tubes being provided with means for varying the cross sectional area of said circumferential slot; and means for axially introducing into said one end of each of said reaction tubes a hydrocarbon feedstock.

6. A reactor according to claim 5 in which said slot is tangentially disposed.

7. A reactor according to claim 5 in which said slot is radially disposed.

8. A reactor according to claim 5 in which the means for introducing hydrocarbon fuel and combustion-supporting oxygen-bearing gas is located near the end of said elongated tubular member opposite to that at which said slots are located in the reaction tubes.

9. A reactor according to claim 1 in which the second hollow member is provided with a plurality of circumferentially located slots near said one end thereof.

10. A reactor according to claim 5 in which each reaction tube is provided with a plurality of circumferentially located slots near the said one end thereof.

11. A reactor according to claim 5 in which the cross sectional area of said slot is substantially rectangular.

12. A reactor for producing carbon black which comprises: an elongated tubular member; a plurality of reaction tubes equidistantly spaced within said member, said member surrounding at least a portion of the length of said tubes; means for introducing a hydrocarbon fuel and a combustion-supporting oxygen-bearing gas into said elongated tubular member; at least one circumferentially located slot in each of said reaction tubes near one end thereof for introducing thereinto a combustion mass resulting from the combustion of said hydrocarbon fuel within said tubular member; at least one perforated baffle member situated between the reaction tubes and extending across the cross-sectional area of said elongated tubular member; and means for axially introducing into said one end of each of said reaction tubes a hydrocarbon feedstock.

13. A reactor according to claim 12 in which each of said reaction tubes is provided with means for varying the cross-sectional area of said slot.

References Cited in the file of this patent

UNITED STATES PATENTS

| | | |
|---|---|---|
| 1,364,273 | Gerard et al. | Jan. 4, 1921 |
| 2,062,358 | Frolich | Dec. 1, 1936 |
| 2,498,444 | Orr | Feb. 21, 1950 |
| 2,785,054 | Bethea et al. | Mar. 12, 1957 |
| 2,915,371 | Sweitzer | Dec. 1, 1959 |
| 2,924,512 | Webster et al. | Feb. 9, 1960 |

FOREIGN PATENTS

| | | |
|---|---|---|
| 809,538 | Great Britain | Feb. 25, 1959 |